(12) United States Patent
Berntsen et al.

(10) Patent No.: US 11,236,600 B2
(45) Date of Patent: Feb. 1, 2022

(54) METHOD FOR CONTROL OF AN INNER TUBE OF AN INCLINED TUBULAR OIL AND WATER SEPARATOR

(71) Applicant: Seabed Separation AS, Trondheim (NO)

(72) Inventors: Jon Sigurd Berntsen, Porsgrunn (NO); Asle Jostein Hovda, Jakobsli (NO)

(73) Assignee: Seabed Separation AS, Trondheim (NO)

( * ) Notice: Subject to any disclaimer, the term of this patent is extended or adjusted under 35 U.S.C. 154(b) by 0 days.

(21) Appl. No.: 17/041,521

(22) PCT Filed: Apr. 8, 2019

(86) PCT No.: PCT/NO2019/050072
§ 371 (c)(1),
(2) Date: Sep. 25, 2020

(87) PCT Pub. No.: WO2019/203657
PCT Pub. Date: Oct. 24, 2019

(65) Prior Publication Data
US 2021/0115771 A1    Apr. 22, 2021

(30) Foreign Application Priority Data
Apr. 20, 2018  (NO) .................................. 20180538

(51) Int. Cl.
| | | |
|---|---|---|
| *E21B 43/34* | (2006.01) |
| *B01D 17/032* | (2006.01) |
| *B01D 17/02* | (2006.01) |
| *B01D 17/12* | (2006.01) |
| *C02F 1/40* | (2006.01) |

(52) U.S. Cl.
CPC .......... *E21B 43/34* (2013.01); *B01D 17/0214* (2013.01); *B01D 17/12* (2013.01); *C02F 1/40* (2013.01)

(58) Field of Classification Search
CPC ............ B01D 17/0208; B01D 17/0214; B01D 17/12; E21B 43/34; E21B 43/36; C02F 1/40; C02F 2209/09
USPC .... 210/739, 800, 801, 143, 519, 532.1, 538, 210/540; 166/267, 75.12
See application file for complete search history.

(56) References Cited

U.S. PATENT DOCUMENTS

| | | | | |
|---|---|---|---|---|
| 4,308,136 A | * | 12/1981 | Warne, Jr. .......... | B01D 17/0208 210/519 |
| 5,837,152 A | * | 11/1998 | Komistek .......... | B01D 17/0214 210/801 |
| 6,099,742 A | * | 8/2000 | Komistek .......... | B01D 17/0214 210/540 |

(Continued)

FOREIGN PATENT DOCUMENTS

| | | |
|---|---|---|
| WO | 0201044 A1 | 1/2002 |
| WO | 2018063007 A1 | 4/2018 |

OTHER PUBLICATIONS

International Search Report and Written Opinion dated Jun. 20, 2019 (PCT/NO2019/050072).

*Primary Examiner* — Christopher Upton
(74) *Attorney, Agent, or Firm* — Alix, Yale & Ristas, LLP

(57) ABSTRACT

Method for control of an inner tube of an inclined tubular separator, wherein the inner tube is provided with an outlet adapted the viscosity of oil introduced into the inner tube.

17 Claims, 4 Drawing Sheets

(56) References Cited

U.S. PATENT DOCUMENTS

| | | | | |
|---|---|---|---|---|
| 7,611,635 B2 * | 11/2009 | Chieng | ............... | E21B 43/34 210/800 |
| 7,617,940 B2 * | 11/2009 | Gramme | ............ | B01D 17/0214 210/519 |
| 8,002,121 B2 * | 8/2011 | Berard | ................ | E21B 43/34 210/538 |
| 9,724,623 B2 * | 8/2017 | Skovholt | ............... | E21B 43/34 |
| 9,827,509 B2 | 11/2017 | Skovholt | | |
| 2005/0150842 A1 * | 7/2005 | Puik | ................. | B01D 17/12 210/800 |

* cited by examiner

METHOD FOR CONTROL OF AN INNER TUBE OF AN INCLINED TUBULAR OIL AND WATER SEPARATOR

BACKGROUND

The disclosed embodiments relate to a method for control of inner tube of an inclined tubular separator, in addition to an inner tube of an inclined tubular separator. The disclosed embodiments are particularly related to control of an inner tube of an inclined tubular separator for separating respective fluid components mixed in fluids from oil wells.

Fluids being produced from oil wells may comprise a mixture of fluid and solid components like oil, water, gas and sand, which are commonly referred to as fluid and solid phases, where the percentage fraction of each respective component may vary from one oil field to another, and also during the operational lifetime of the same oil well. It is for example common to have an increase in water content from oil wells towards the end of the production life time of the oil wells. Separation of fluid components may be necessary to be able to accomplish further processing of the oil and gas in a refinery for example. However, the requirement of further separation is not always a demand. Sometimes there is a demand for very clean oil with a very low water content, while in other cases some water in the produced oil, for instance 1% to 5% may be tolerated.

Relevant teachings are found in EP2981341-METHOD FOR SEPARATING SUBSTANCES MIXED IN FLUIDS FROM OIL WELLS and EP2934714-INCLINED TUBULAR SEPARATOR FOR SEPARATING OIL WELL SUBSTANCES, both in the name of the applicant, describing an inclined tubular separator in the form of a dual pipe separator, system and method for providing separation of respective fluid components mixed in fluids from oil wells.

The prior art methods and devices do not allow customization of the inner tube of the inclined tubular separator according to existing conditions.

Additionally, the prior art methods and devices do not allow arranging for handling changing viscosity of oil introduced into the inner tube.

Hence, a method for control of and inner tube of an inclined tubular separator are desired.

SUMMARY

Provided herein is a method for control of and an inner tube of an inclined tubular separator partly or entirely solving the above mentioned drawbacks of prior art and present demands.

Also provided is a method for control of and inner tube of an inclined tubular separator providing enhanced separation of oil from water.

Also provided is a method for control of and an inner tube of an inclined separator enabling adaption of the properties of the inner tube in relation to according to introduced oil well substances.

Also provided is a method for control of and an inner tube of an inclined tubular separator arranged to counteract affection from changing viscosity of introduced oil.

Also provided is a method for control of and an inner tube of an inclined tubular separator comprising providing the inner tube with an outlet and controlling opening of the outlet according to viscosity of introduced oil according.

Also provided is a method for control of and an inner tube of an inclined separator where the opening of the outlet is controllable and controlling the opening of the outlet according to viscosity of oil introduced into the inner tube.

The inventive embodiments are related to a method for control of and inner tube of inclined tubular separator for separating oil well substances, as described in EP2981341 and EP2934714, both in the name of the applicant, the content of both included herein by reference.

The inventive embodiments are accordingly related to improvement of an inclined tubular separator comprising:
  an elongated outer tube and an elongated inner tube, where the inner tube is arranged inside the outer tube,
  where oil well substances are introduced into an end of the inner tube via a feed section passing through the outer tube and into the inner tube,
  and where the inner tube comprises multiple holes or slots arranged in a longitudinal direction,
  where the inclination of the tubular separator facilitates separation of the oil well substances into lower density substances and higher density substances.

In the inclined tubular separators, lower density substances by buoyancy drift upwards through the slots or holes and exit via an upper outlet in the outer tube, and higher density substances sink downwards through the slots or holes and by gravitation exit via a lower outlet in the outer tube.

The main purpose of the inclined tubular separator, also known as a dual pipe separator, is that it should work as a separator for removing free water to from the inclined tubular separator.

Removal of water is performed while the oil flows through the inclined tubes without exerting any pressure drop beyond natural pressured drop in flowing media.

The height between the inlet and outlet will thus be important as this static height is used for controlling interphase between water and oil at use of an outlet letting the water out.

The static height is defined by the angle of the inclined tubular separator and the length of the inner and outer tubes, but if the flow resistance is high this can override the static height. Accordingly, the inclined tubular separator is initially set up with a desired angle and desired interface between oil and water, but change in flow resistance can, as mentioned, override this initial setup, reducing the efficiency of the inclined tubular separator.

Changes in flow resistance will arise when viscosity of the introduced oil increases or decreases. An increase in the viscosity of introduced oil will affect the interphase due to there will be a counterpressure in the outer tube such that the interphase is forced towards the water outlet. A decrease will result in the opposite results of the interphase. It is especially an increase in the viscosity of the introduced oil that is important to counteract, as this will affect the interphase between oil and water most negatively as regards efficiency of the inclined tubular separator.

Reference is made to FIG. 4 which is a principle drawing of a disclosed inner tube. The inner tube is provided with an outlet at upper end, i.e. at opposite end of the inner tube than the inlet, which according to the present invention can be tailored/controlled to desired properties.

The mentioned pressure drop is counteracted by that opening of the outlet of the inner tube is controlled as a function of the viscosity of the introduced oil.

Flow rate Q in the inner tube of the inclined tubular separator will be given by:

$$Q = \frac{\Delta P}{R},$$

where ΔP is the pressure drop over the outlet section of the inner tube and R is the flow resistance.

The flow resistance R in the inner tube of the inclined tubular separator will be given by:

$$R = \frac{8*\eta*L}{\pi*r^4},$$

where η is the oil viscosity and L is the length of the liquid filled inner tube.

By combining the expressions for flow rate Q and flow resistance R the result will be:

$$Q = \frac{\pi*r^4*\Delta P}{8*\eta*L},$$

which provides an expression for flow rate. As one can see by the expression an increase in viscosity η will be counteracted by an increase in radius r of the opening of the outlet of the inner tube. In other words, the expression describes the relation between viscosity and cross section of the inner tube, which again controls the pressure drop.

The radius r can thus be controlled by:

$$r = \sqrt[4]{\frac{Q*8*\eta*L}{\pi*\Delta P}}.$$

By measuring flow rate Q by means of a flow meter and measuring the viscosity η of oil by means of a viscometer or rheometer, or flow resistance R, r can be calculated and used for setting the opening of the outlet of the inner tube by that the area of the opening is given by π*r².

The calculated area of the circular opening can further be used for recalculating area for openings not having a circular shape, such as e.g. a slotted opening.

Accordingly, the opening of the outlet of the inner tube can be controlled between full opening, reduced opening or fully closed opening.

If the oil has a viscosity η higher than 100 cP the opening of the outlet will be a full opening, while if the viscosity η is between 15 cP and 100 cP the opening of the outlet will be a reduced opening, while of the viscosity η of oil is lower than 15 cP (i.e. when changes in water cut is occurs) the opening of the outlet will be fully closed.

Accordingly, the inner tube can be provided with an outlet that can be designed/tailored/controlled according to viscosity (η) of oil introduced into the inner tube and in this way counteract changes in viscosity (η) of oil introduced into the inner tube affecting the efficiency of the inclined tubular separator.

By arranging the outlet to a control unit the opening of the outlet can be controlled, such that the opening of the outlet at any time during use (real time control) can be adapted to the current properties/conditions. The control unit can be provided with measurements of flow rate and flow resistance or viscosity, and based on this control the opening of the inlet.

BRIEF DESCRIPTION OF THE DRAWINGS

The inventive embodiments will below be described in further detail with references to the attached drawings, where.

DETAILED DESCRIPTION

Figure 1:
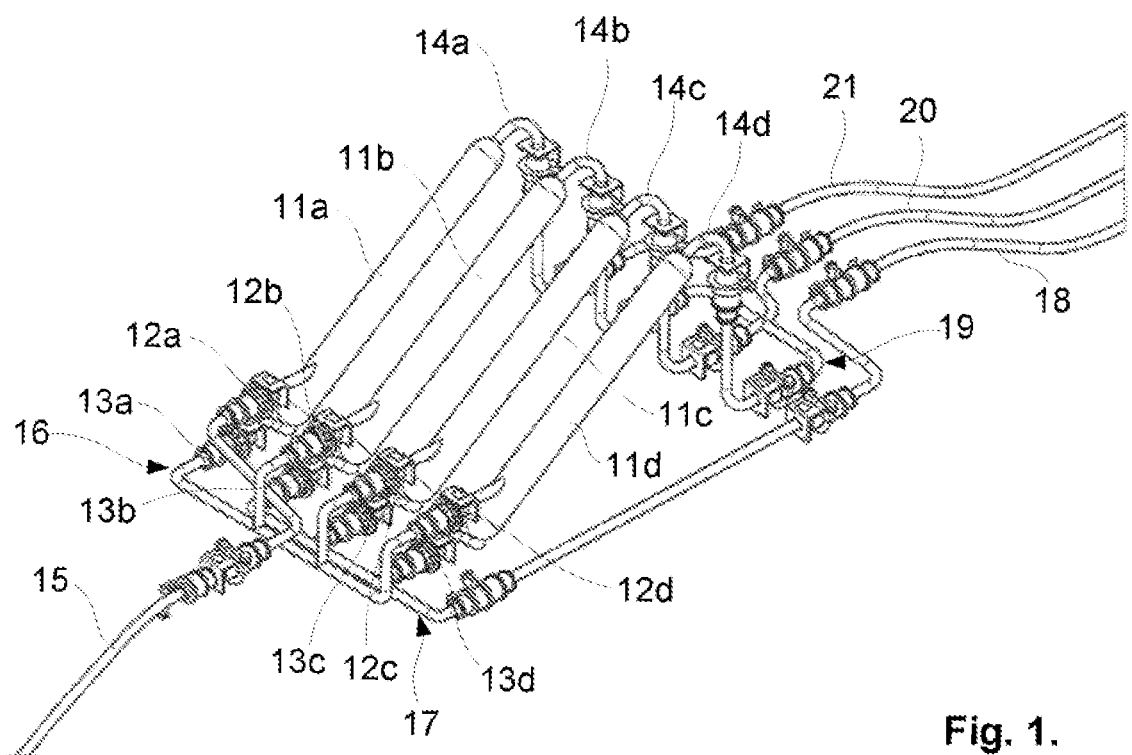
FIG. 1 is a principle drawing of an inclined separator system according to prior art.
Figure 2:
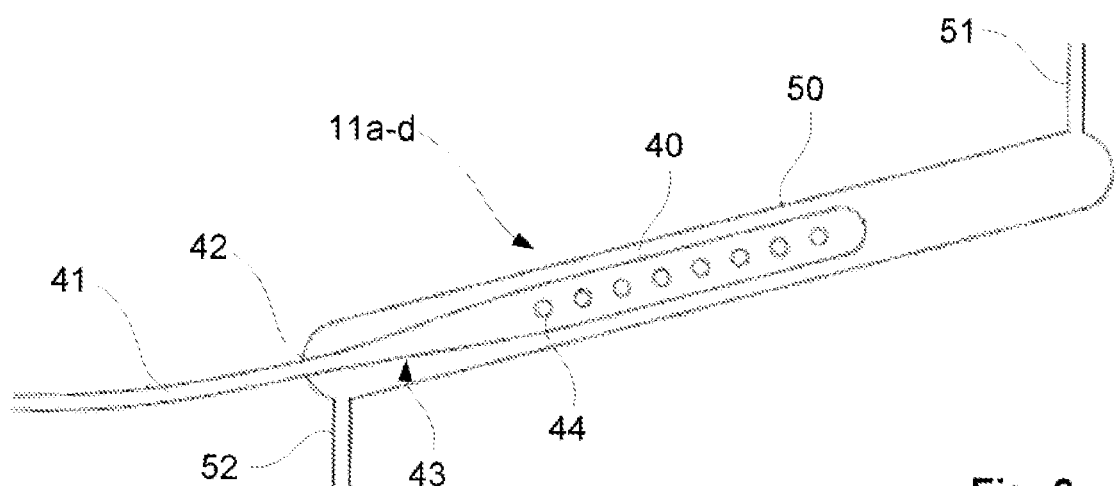
FIG. 2 is principle drawing showing the interior of an inclined tubular separator of the inclined separator system in FIG. 1.

Reference is first made to FIGS. 1 and 2 which are principle drawings of a separator system according to prior art, as described in EP2981341 and EP2934714, illustrated by a separator system comprising four interconnected inclined tubular separators 11a-d using gravity as the separating force.

Each inclined tubular separator 11a-d has a respective inlet 12a-d in a lower section of the inclined tubular separator 11a-d, and a respective outlet 13a-d also located in the lower/bottom section of the inclined tubular separator 11a-d. A respective outlet 14a-d is located in an upper section of the inclined tubular separator 11a-d.

The separator system is supplied with fluid from an oil well (not shown) by a pipe 15 and via an input manifold 16 which distributes the fluid to the respective inclined tubular separators 11a-d and interconnecting the inclined tubular separators 11a-d in a parallel fashion, or in series, or in a combination of parallel and serial configurations. There is further arranged a first output manifold section 17 interconnecting the outlets 13a-d in a parallel fashion, or in series, or in a combination of parallel and serial configurations to an outlet pipe 18.

There is further arranged a second output manifold section 19 interconnecting the outlets 14a-d from the inclined tubular separators 11a-d, in a parallel fashion, or in series, or in a combination of parallel and serial configurations to an outlet pipe 20, with respect to the number of phases the separator system is adapted and manufactured to separate.

In this illustrated example, three of the inclined tubular separators 11b-d are interconnected such that the three outlet openings 14b-d of these in the upper section of the inclined separator system from the three respective tubular separators 11b-d are connected together to a common outlet pipe 20, while one outlet 14a in the upper section from a fourth inclined tubular separator 11a is connected to an outlet pipe 21.

The lower outlet 12b-d of the inclined tubular separators 11b-d are connected together to the outlet pipe 18, while the lower outlet 12a of the inclined tubular separators 11a is connected to the respective inlets 12a-d of the inclined tubular separators 11b-d.

The fluid streaming through the pipe 15 passes a first tubular separator 11a wherein the gas is separated from the fluid because the density of the gas is lower than other fluid phases present in the incoming fluid. The gas phase is transported out through the outlet 14a in the upper section of the inclined tubular separator 14 to the outlet pipe 21.

The outlet 13a of the first inclined tubular separator 14a is connected in parallel to inlets 12b-d of the respective inclined tubular separators 11b-d thereby providing a sufficient separator capacity for separating oil from water and sand, for example. The oil phase is transported out of the separator system via the respective outlets 14b-d of the respective inclined separators 11b-d, and in the output manifold section 19 these outlets are connected together and are connected to the outlet pipe 20 of the separator system. The water and sand phase is transported out of each respective inclined tubular separators 14b-d being configured to separate oil from water and sand via the outlets 13b-d being located in the bottom section of the inclined separator system first outlet manifold 17 an to the outlet pipe 18.

The interconnection pattern provided for with pipe connections in the input manifold section 17, is reflected in the output manifold section 19. The pattern of interconnecting pipes reflects the properties of the incoming fluids from an oil well, while the interconnection pattern in the output manifold section 19 reflects how many fluid phases that are to be separated and how different fluid phases will still be combined. Therefore, there is a functional relationship between the interconnecting pattern of pipes in the input manifold section 17 and the output manifold section 19, but not necessary as a one to one mapping of the configuration of the respective pipes in each respective manifold section.

Reference is now made to FIG. 2, showing details of the interior of the inclined tubular separators 11a-d. The inclined tubular separators 11a-d have an inner elongated tube 40 located centered inside an outer elongated tube 50, wherein the inner tube 40 is in fluid communication with the input manifold 17 or pipe 15 via the respective inlets 12a-d and via a curved pipe 41 extending out of the outer tube 50 via an opening 42 in a side wall of the outer tube 50 at a lower section of the inclined tubular separator 11a-d. The inner tube 40 exhibits a conical shaped part 43 at the lower/inlet part thereof expanding in width from the curved pipe 41 to a final width of the inner tube 40. The walls of the inner tube 40 are further perforated with a plurality of holes or slots 44, and the inner tube 40 is terminated and closed at upper end thereof. The outer tube 50 has a first outlet opening 51 arranged at upper end thereof connected to the outlet 14a-d and a second outlet opening 52 at lower end thereof connected to the outlet 13a-d. The curved pipe 41 provides a small cyclone effect separating oil and water in two layers before the mixed fluid enters the conical shaped part 43. The conical shape will reduce the speed of the fluid before passing the inner tube holes or slots 44.

Figure 3:
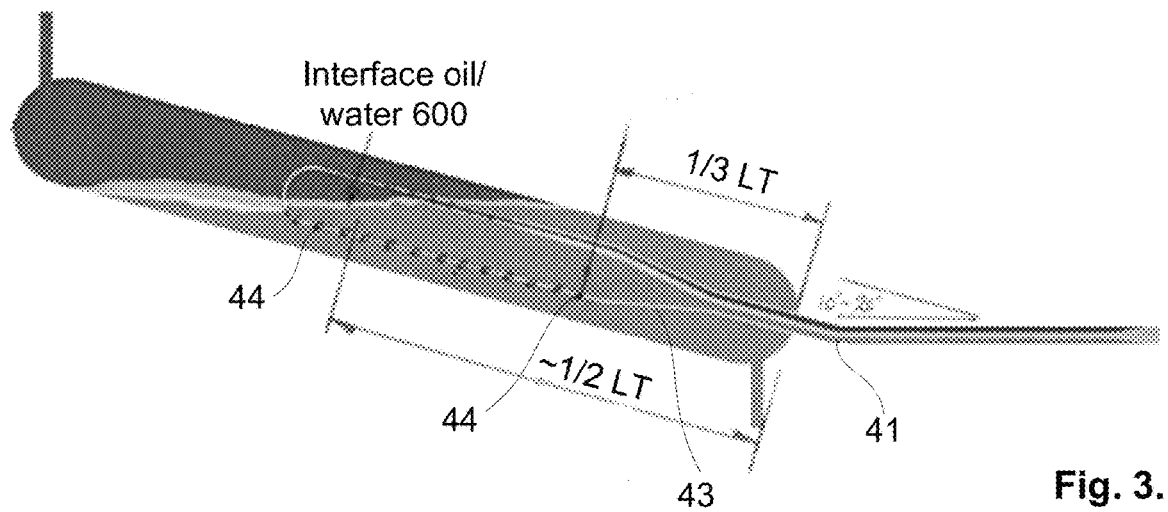
FIG. 3 is principle drawings of an inclined tubular oil and water separator showing details of holes or slots, and oil and oil and water interface.
Figure 4:
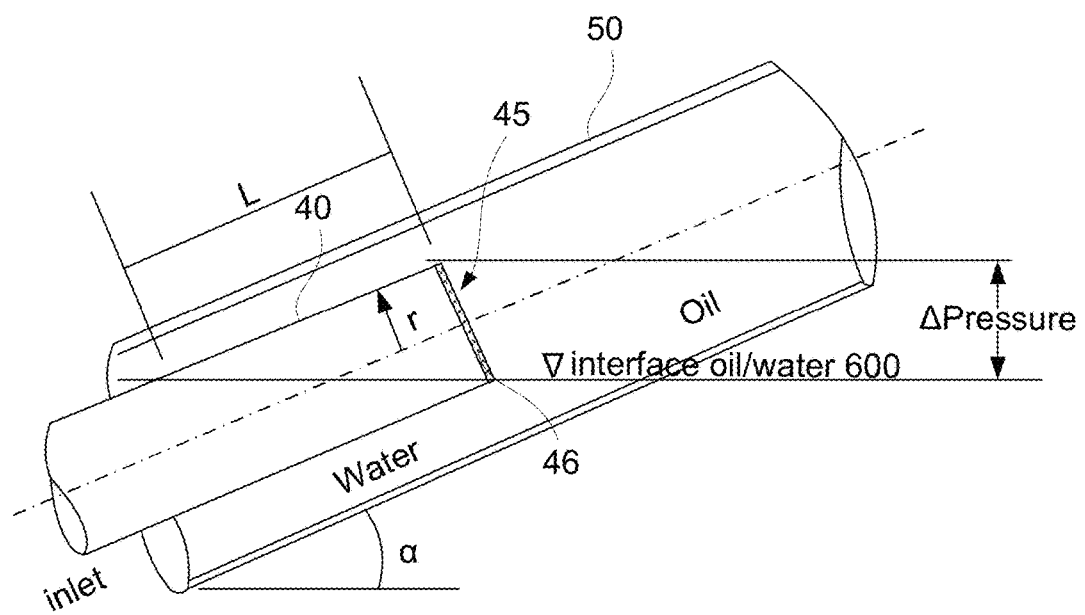
FIG. 4 is a principle drawing of an inner tube of an inclined tubular separator according to the disclosed embodiments.

Reference is now made to FIG. 3 showing a detailed view of the interior of the inclined tubular oil and water separators 11a-d. The curved pipe 41 will preferably exhibit an angle of between 10° to 20° representing the inlet section of the inclined tubular oil and water separators 11a-d. The angle of the conical part 43 (expanding part) is preferably between 5° and 15°, more preferably between 7° and 10°, with reference to the center line of the inner tube 40.

Further, the location of the first hole or slot 44, referred to inlet end of the inclined tubular oil and water separator 11a-d, at least at the water side, start approx. ⅓ of the overall length LT of the inclined tubular oil and water separator 11a-d, i.e. after the conical part 43.

It should be mentioned that the number and size of holes or slots 44 at the oil and water side, respectively, can be different. Also the location of the first hole or slot 44 on the oil side (upper side) can be further from the inlet end of the inclined tubular oil and water separator 11a-d than the first hole or slot 11a-d at the water side (the lower side).

The interface 600 between oil and water is preferably located at approx. 50-70% of the overall length LT of the inclined tubular oil and water separator 11a-d, referred to inlet end of the inclined tubular oil and water separator 11a-d.

Reference is now made to FIGS. 5A-5E showing principle drawings of an inner tube 40. According to the prior art inclined tubular separator shown in the FIGS. 1-3, the inner tube 40 is terminated and closed at upper end. The upper end of the inner tube 40 will be provided with an outlet 45 that can be adapted in relation to current conditions, and especially as a function of the viscosity of oil, to counteract pressure drop in increase of the viscosity of oil.

According to one embodiment, the outlet 45 is formed by at least one controllable valve 46. According to a further embodiment, the outlet 45 is formed by two or more valves 46 arranged in series to achieve different properties.

Figure 5A:
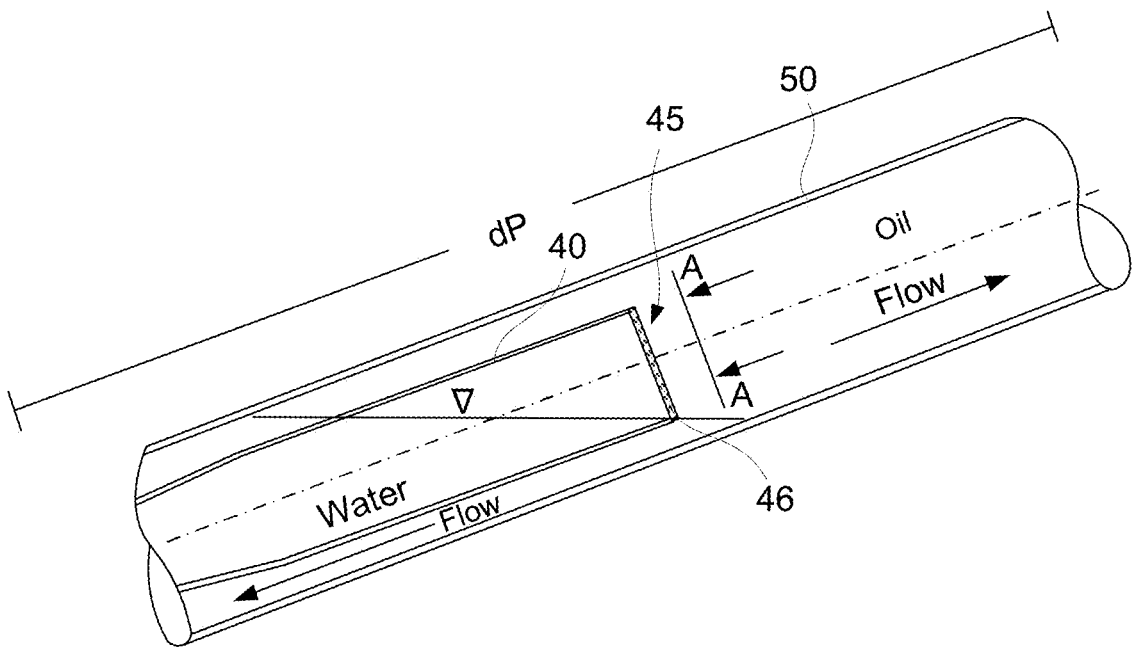
FIG. 5A-5E are principle drawings of an inner tube of an inclined tubular separator according to the disclosed embodiments.
Figure 5B:
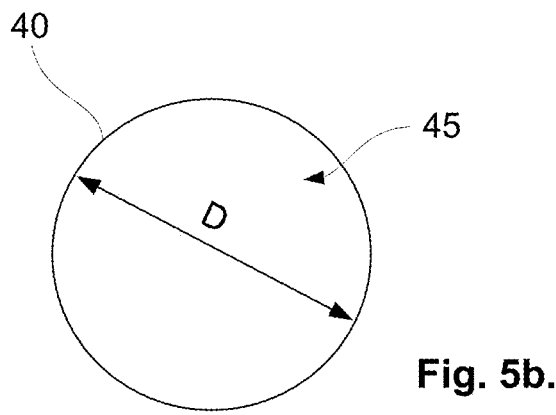
Figure 5C:
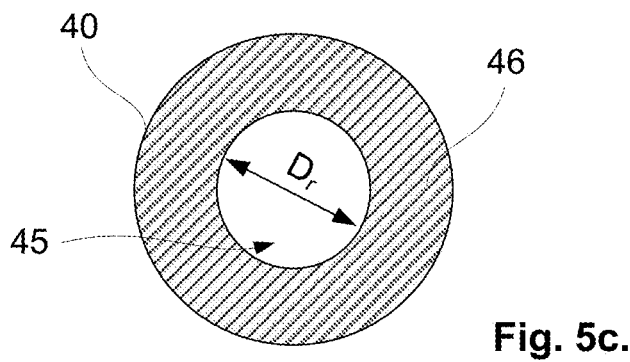

In FIG. 5B is shown a cross sectional view of the outlet 45 where there is a full opening, i.e. full bore. This position will be suitable when the viscosity $\eta$ of the oil is >100 cP and density $\rho$ is <API 15. In FIG. 5C is shown a cross-sectional view of the outlet 45 where there is a reduced opening, i.e. reduced bore. This position will be suitable when the viscosity $\eta$ of the oil is >50 cP and density $\rho$ is <API 20.

Figure 5D:
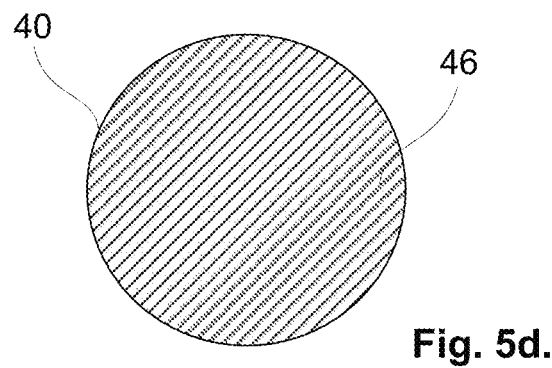

In FIG. 5D is shown a cross-sectional view of the outlet 45 where there is a closed opening, i.e. a position similar to the terminated and closed end as for the inner tube of FIGS. 1-3. This position will be suitable when the viscosity $\eta$ of the oil is <15 cP and density $\rho$ is >API 28.

Figure 5E:
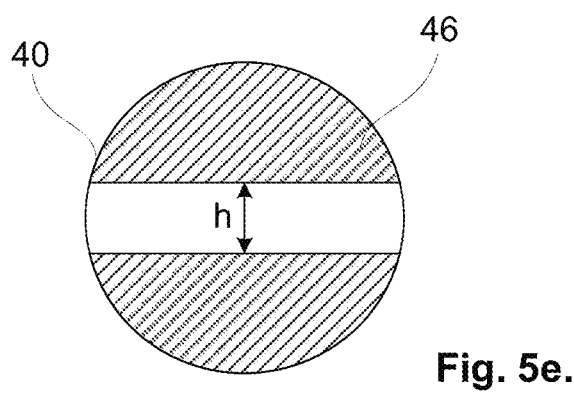

In FIG. 5E is shown a cross-sectional view of the outlet 45 where it is used a valve 46 exhibiting a slotted opening, where the height is 0.2-0.3×D of the inner tube 40. This position will be suitable when the viscosity $\eta$ of the oil is >15 cP and density $\rho$ is between API 20-28. In the case of the use of a valve 46 with a slotted opening one will have to recalculate the area equivalent to radius calculation as described above.

Figure 6:
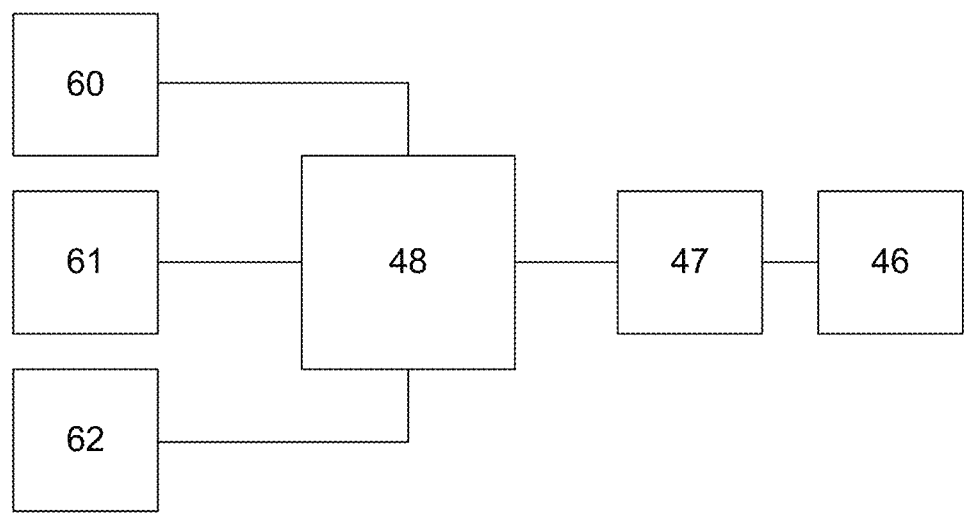
FIG. 6 is a block diagram of controlling of an inner tube according to the disclosed embodiments.

Reference is now made to FIG. 6 which is a block diagram of controlling of an inner tube 40. By arranging the at least one valve 46 of the outlet 45 to an actuator 46 controlled by a control unit 47 the opening of the outlet 45 can be controlled according to current conditions. By e.g. flow measurement from a flow meter 60 (known per se) and flow resistance measurement from flow resistance meter 61 (known per se) or viscosity measurements from a viscometer 62 (known per se), the control unit 48 is provided with measurements which are used as input for controlling the at least one valve 46 controlling the opening of the outlet 45 according to current conditions, hereunder current viscosity of the introduced oil.

In this way, increase in viscosity $\eta$ of the oil can be counteracted by an increase in the radius of the opening and a decrease in viscosity $\eta$ can be counteracted by a decrease in the radius of the opening, which will provide optimal function of the inclined separator at all times.

The controlling of the opening of the outlet 45 can be performed continuously or at desired intervals.

The invention claimed is:

1. A method for controlling an inner tube (40) of an inclined tubular oil and water separator (11a-d) formed by an elongated outer tube (50) within which the inner tube (40) is arranged, the inner tube (40) being configured to receive oil well substances introduced into one end thereof via a feed section passing through the outer tube (50) and into the inner tube (40), the inner tube (40) comprising multiple holes or slots (44) arranged in a longitudinal direction and having an upper end, comprising the steps of:

(a) providing the inner tube (40) with an outlet (45) at the upper end; and (b) controlling opening and closing of the outlet (45) according to a viscosity ($\eta$) measurement of oil introduced into the inner tube (40).

2. The method according to claim 1, comprising the steps of:

measuring flow rate (Q) and flow resistance (R) or viscosity ($\eta$) of oil introduced into the inner tube (40);

using the measurements to calculate an area of the opening of the outlet (45); and adjusting the opening of the outlet (45) according to the calculated area.

3. The method according to claim 2, comprising fully opening the outlet (45) in step (b) if the measured viscosity ($\eta$) of oil is higher than 100 cP.

4. The method according to claim 2, comprising reducing the area of the opening of the outlet (45) in step (b) if the measured viscosity ($\eta$) of oil is between 15 and 100 cP.

5. The method according to claim 2, comprising fully closing the opening of the outlet (45) in step (b) if the measured viscosity ($\eta$) of oil is lower than 15 cP.

6. The method according to claim 1, comprising fully opening the outlet (45) in step (b) if the measured viscosity ($\eta$) of oil is higher than 100 cP.

7. The method according to claim 1, comprising reducing the area of the opening of the outlet (45) in step (b) if the measured viscosity ($\eta$) of oil is between 15 and 100 cP.

8. The method according to claim 1, comprising fully closing the opening of the outlet (45) in step (b) if the measured viscosity ($\eta$) of oil is lower than 15 cP.

9. The method according to claim 1, wherein opening and closing of the outlet (45) is controlled continuously.

10. The method according to claim 1, wherein opening and closing of the outlet (45) is controlled only at predetermined intervals.

11. An inner tube (40) of an inclined tubular oil and water separator (11*a-d*) formed by an elongated outer tube (50) within which the inner tube (40) is arranged, the inner tube (40) having an upper end and a first end within which oil well substances are introduced via a feed section passing through the outer tube (50) and into the inner tube (40), comprising:

multiple holes or slots (44) arranged in a longitudinal direction of the inner tube (40), an outlet (45) at the upper end, wherein the outlet (45) is configured to be controlled to open and close according to a viscosity ($\eta$) measurement of oil introduced into the inner tube (40).

12. The inner tube (40) according to claim 11, wherein the outlet (45) is formed by at least one controllable valve (46).

13. The inner tube (40) according to claim 12, comprising an actuator (47) to which the at least one controllable valve (46) is arranged, wherein the actuator (47) is controlled by a control unit (48).

14. The inner tube (40) according to claim 13, wherein the control unit (48) is configured to control the at least one controllable valve (46) based on measurements from a flow meter (60) and flow resistance meter (61) or viscometer (62).

15. The inner tube (40) according to claim 11, characterized in that the outlet (45) is formed by two or more controllable valves (46) arranged in series.

16. The inner tube (40) according to claim 15, comprising an actuator (47) to which the two or more controllable valves (46) are arranged, wherein the actuator (47) is controlled by a control unit (48).

17. The inner tube (40) according to claim 16, wherein the control unit (48) is configured to control the two or more controllable valves (46) based on measurements from a flow meter (60) and flow resistance meter (61) or viscometer (62).

\* \* \* \* \*